Patented Aug. 27, 1940

2,212,531

UNITED STATES PATENT OFFICE 2,212,531

ETHERS OF DUROHYDROQUINONE AND PROCESS OF PREPARING THEM

Fritz von Werder, Darmstadt, Germany, assignor to Merck & Co., Inc., Rahway, N. J., a corporation of New Jersey No Drawing. Application October 11, 1938, Serial No. 234,507. In Germany October 14, 1937

10 Claims. (Cl. 260—613)

This invention relates to ethers of durohydroquinone and to processes of preparing the same, and more particularly to mono-ethers of durohydroquinone having the formula $C_6(CH_3)_4(OH)OR$, wherein R is a member selected from the group consisting of an alkyl radical, an alkylene radical, and a hydroaromatic radical, said radicals having from 6 to 14 carbon atoms.

The mono-ethers of the above type may be prepared in various ways, for example by reacting durohydroquinone with an alkyl halide, an alkylene halide, or a hydroaromatic radical halide, said radicals having from 6 to 14 carbon atoms, preferably in an alkaline solution such as an alcoholic alkaline or an acetonic alkaline solution. Also, the direct condensation of the alcohol with durohydroquinone may be effected in the presence of acids. The desired mono-ethers may also be obtained by etherifying a mono-acyl durohydroquinone, for example the mono-acetyl compound, and subsequently removing the acyl group by saponification.

In the preparation of the mono-ethers according to the present invention, di-ethers often result as by-products. The two ethers can be easily separated from each other because of their different solubility in organic solvents. After separation of the ethers, the di-ether may be treated with an agent capable of cleaving it into a mono-ether, for example aluminum chloride, acid salts, such as potassium bisulfate, acid halides, aniline hydrochloride, etc. In each individual case of cleavage to the mono-ether, the best possible reaction conditions should be determined by a series of comparative tests, such as the determination of the quantity of concentration of the cleavage agent, temperature, etc. In general, the cleavage can be effected by refluxing a solution of the di-ether in a solvent such as benzene, in the presence of anhydrous aluminum chloride, and recovering the mono-ether by distillation.

The following example illustrates a method of carrying out the present invention, but it is understood that the example is by way of illustration and not of limitation.

Example 16.6 g. of finely powdered durohydroquinone, 32.2 g. of n-dodecyl bromide and 100 cc. of absolute alcohol are heated with constant stirring to 85° C. while bubbling through hydrogen. Over a period of one hour, 100 cc. of normal absolute alcoholic potassium hydroxide are added drop by drop. After additional stirring for one half hour at 85° C., the reaction mixture becomes clear and the alkaline reaction ends. Stirring is continued at 85° C. for another six hours, and then the mass is cooled in ice water. A crystal mash is precipitated, which is filtered and washed with alcohol. The material thus obtained is stirred in water, filtered, thoroughly washed with water and repeatedly recrystallized from alcohol, whereby colorless leaflets of durohydroquinone-bis-dodecyl ether, melting at 83° C., are obtained.

All of the alcoholic mother liquors are combined and concentrated under vacuum to a volume of about 500 cc. 2 liters of water are added, followed by complete extraction with ether. To remove any unconverted durohydroquinone, the combined ether extracts are repeatedly shaken with a mixture of equal parts by volume of 50% aqueous potassium hyroxide and methanol, washed with water, dried, filtered and concentrated by evaporation. The residue is subjected to fractional distillation under vacuum. After a preliminary run of dodecylbromide and a slight quantity of duroquinone, the durohydroquinone-mono-n-dodecyl ether goes over under vacuum at 1.5 mm. of mercury and 215° C. The distillate, which solidifies immediately, is purified by recrystallization from methanol. A yield of 7 g. of colorless leaflets with a melting point of 97° C. is obtained.

One administration of a 100 mg. dose of the mono-ether will overcome sterility in female rats fed on a vitamin E deficient diet. Presumably this dose can be reduced even further.

The acetate of durohydroquinone-mono-n-dodecyl ether, prepared in the usual manner, melts at 95–96° C.

Other similar ethers may be obtained by substituting for the dodecyl bromide, different alkyl halides, alkylene halides, and hydroaromatic halides, in which the radicals have from 6 to 14 carbon atoms.

The mono-ethers of the present invention have striking physical and chemical properties. In spite of their phenolic nature, they are insoluble in alkali, and in general possess very weak phenolic properties. Generally speaking, they are crystalline and can be distilled in high vacuum. Chemically, they are characterized by strong reducing action. For example, in alcohol, solution with gentle warming, silver nitrate is reduced to metallic silver. They possess valuable therapeutic properties. And physiologically, they control sex functions. For example the so-called resorption sterility of female rats is overcome by the addition of the ether to the diet of the animals. This action corresponds to the action of the natural vitamin E.

I claim:

1. Compounds of the formula $$C_6(CH_3)_4(OH)OR,$$

wherein R is a member selected from the group consisting of an alkyl radical, an alkylene radical, and a hydroaromatic radical, said radicals having from 6 to 14 carbon atoms.

2. The compound $C_6(CH_3)_4(OH)OR$, in which R is an alkyl radical having from 6 to 14 carbon atoms.

3. The compound $C_6(CH_3)_4(OH)OR$, in which R is an alkylene radical having from 6 to 14 carbon atoms.

4. The compound $C_6(CH_3)_4(OH)OR$, in which R is a hydroaromatic radical having from 6 to 14 carbon atoms.

5. The compound of the formula $$C_6(CH_3)_4(OH)OC_{12}H_{25}.$$

6. The process comprising reacting durohydroquinone with a member selected from the group consisting of an alkyl halide, an alkylene halide and a hydroaromatic radical halide, said radicals having from 6 to 14 carbon atoms.

7. The process according to claim 6, in which the reaction is carried out in a solution of an alkali metal hydroxide.

8. The process comprising reacting durohydroquinone with dodecyl-bromide in the presence of a solution of an alkali metal hydroxide.

9. The process comprising reacting durohydroquinone with dodecyl-bromide in the presence of a solution of an alkali metal hydroxide, separating the di-ether from the mono-ether formed by the reaction, reacting the di-ether with an agent capable of cleaving the di-ether into a mono-ether, and recovering the mono-ether.

10. The process comprising reacting durohydroquinone with dodecyl-bromide, separating the di-ether from the mono-ether formed by the reaction, treating the di-ether with anhydrous aluminum chloride, and recovering the mono-ether formed by the latter reaction.

FRITZ VON WERDER.